United States Patent Office 3,551,445
Patented Dec. 29, 1970

3,551,445
3-(2-AMINOPHENYL)-OXO-ISOINDOLE-2-ACETIC ACID DERIVATIVES
Goetz E. Hardtmann, Florham Park, and Hans Ott, Convent Station, N.J., asisgnors to Sandoz-Wander, Inc., a corporation of Delaware
No Drawing. Original application Apr. 14, 1967, Ser. No. 630,835, now Patent No. 3,506,647. Divided and this application Nov. 18, 1969, Ser. No. 871,304
Int. Cl. C07d 41/06, 27/50
U.S. Cl. 260—325                    2 Claims

ABSTRACT OF THE DISCLOSURE

The title compounds are of the class of isoindolo-[2,1-d][1,4]benzodiazepin-6,9(7H,13bH)diones, e.g., 2-chloro-5-methylisoindolo[2,1-d][1,4]benzodiazepin - 6,9-(7H,13bH)dione. The compounds are useful as anticonvulsants, sedatives and tranquilizers. The title compounds may be obtained by converting an appropriate 3-(5-unsubstituted or -5-halo-, 2-methyl- or 2-ethylaminophenyl)isoindolin-1-one to its corresponding 2-acetic acid lower alkyl ester, which is then cyclized to the corresponding title compound.

---

This application is a division of Ser. No. 630,835, filed Apr. 14, 1967, now U.S. Pat. No. 3,506,647.

The compounds of this invention are isoindolo[2,1-d]-[1,4]benzodiazepin-6,9(7H,13bH)diones of the formula:

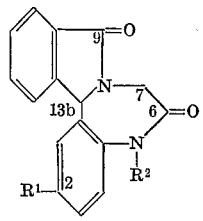

I wherein
$R^1$ is a member selected from the group consisting of a hydrogen atom, and halo having an atomic weight of 19 to 80, i.e., fluoro, chloro, and bromo; and
$R^2$ is alkyl having from 1 to 2 carbon atoms, i.e., methyl or ethyl.

Compounds I are obtainable by the procedure of the following reaction scheme wherein $R^1$ and $R^2$ are as defined above, X is halo of atomic weight of 35 to 127, i.e., chloro, bromo and iodo, and $R^3$ is lower alkyl, e.g., methyl, ethyl, propyl, butyl, amyl or hexyl:

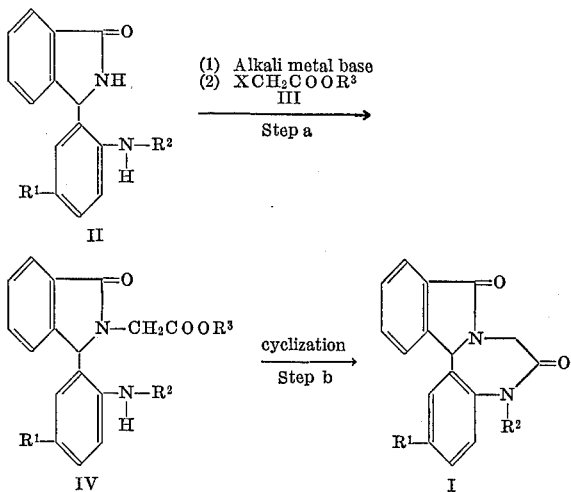

According to the reaction scheme Step (a) involves N-alkylating a Compound II, i.e., a 3-(2-methyl- or 2-ethylaminophenyl)isoindolin-1-one, with a Compound III, i.e., a lower alkyl ester of an alphahalo acetate, e.g. ethyl bromoacetate to form the corresponding Compound IV. The N-alkylation is effected in a conventional manner by (1) first forming an alkali metal salt of the Compound II and then (2) reacting said salt with Compound III to obtain the corresponding Compound IV. It is preferred to (1) form an alkali metal salt of the Compound II by reacting the Compound II with a strongly basic alkali metal-containing compound, e.g., NaH, under anhydrous conditions in a suitable solvent, e.g., N,N-dimethylformamide or N,N-dimethylacetamide, and then (2) react said salt of the Compound II under anhydrous conditions in a suitable solvent with a Compound III, e.g., in situ, i.e., carrying out parts (1) and (2) sequentially by adding the Compound III to the reaction mixture containing said salt of Compound II. While the temperatures at which parts (1) and (2) are carried out are not critical, temperatures of 40° to 70° are preferred.

In Step (b) Compound IV is cyclized to the corresponding Compound I under acid conditions by conventional means. The cyclization is preferably effected by dissolving the Compound IV in a lower fatty acid, e.g., glacial acetic acid or propionic acid (at least 100 parts by volume per 15 parts of Compound IV), and then boiling off most, e.g., up to 75%, of the fatty acid, e.g., at atmospheric pressure.

Compounds II are obtainable by the procedures described in Netherlands Patent 6607814, published Dec. 12, 1966.

Compounds I are useful as anticonvulsants, sedatives and tranquilizers. They are administered to mammals either orally or parenterally in daily doses of from 1 to 5 mg./kg. of body weight, e.g., for most mammals from 60 to 300 milligrams per diem, preferably administered in doses of 15 to 150 milligrams; a single daily oral dose is also acceptable.

Each of the pharmaceutically active compounds of this invention may be, e.g., incorporated for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; an average dosage of active ingredient; and q.s. 100 percent of filler, e.g., lactose; all percentages being by weight. Tablets are prepared according to standard tabletting techniques, which are well-known in the art, employing the necessary amounts of conventional granulating liquids, e.g., alcohol SD-30 and purified water. An exemplary tabletting formulation for the instant active compounds is:

| | Parts |
|---|---|
| Title compound of the example | 60 |
| Tragacanth | 2. |
| Lactose | 29.5 |
| Corn Starch | 5. |
| Talcum | 3, |
| Magnesium Stearate | 0.5 |
| Alcohol SD-30 | q.s. |
| Purified water | q.s. |

An example illustrative of this invention follows. Throughout this disclosure all temperatures are centigrade (room temperature is 20°) and all percents and parts are by weight, unless specified otherwise. Parts by weight are related to parts by volume as a kilogram is related to a liter.

EXAMPLE 2-chloro-5-methyl-isoindolo[2,1-d][1,4]benzodiazopine-6,9(7H,13bH)dione

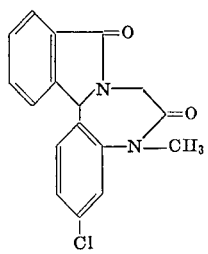

This example illustrates the preparation of a Compound I according to the reaction scheme present above.

(a) 3-(5-chloro-2-methylaminophenyl)-1-oxo-isoindolo-2-acetic acid ethyl ester

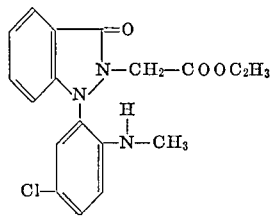

Dissolve 16.2 parts of 3-(5-chloro-2-methylaminophenyl)isoindolin-1-one in 180 parts by volume of anhydrous N,N-dimethylformamide and add 2.5 parts of sodium hydride (as a 56% suspension in mineral oil). Warm the mixture to 60°; add with stirring 7.2 parts by volume of ethyl bromoacetate and maintain the mixture, with stirring, at 60° for 12 hours. Pour the reaction mixture over 500 parts of ice and extract thrice with 150 parts by volume portions of chloroform. Wash the combined extracts with 150 parts by volume of water, then with 150 parts by volume of saturated aqueous sodium chloride, and then dry over sodium sulfate. Remove the chloroform by evaporation under vacuum to obtain a residue, then add diethyl ether to precipitate the crude Compound (a). Recover the crude Compound (a) by filtration, then take up in chloroform and filter through silica gel to clarify. Recrystallize from ethanol to obtain purified Compound (a) melting point, (M.P.) 149° to 153°.

(b) 2-chloro-5-methyl-isoindolo[2,1-d][1,4]benzodiazepine-6,9(7H,13bH)dione

Dissolve 3 parts of Compound (a), i.e., 3-(5-chloro-2-methylaminophenyl)-1-oxo-isoindolo-2-acetic acid ethyl ester, in 60 parts by volume of glacial acetic acid. Slowly distill off, at atmospheric pressure, 70% of the glacial acetic acid over a period of 8 hours then remove the remainder of the glacial acetic acid under vacuum to obtain a residue. Dissolve the residue in 100 parts by volume of methylene chloride. Wash the solution with 50 parts by volume of 10% aqueous sodium carbonate, then wash with 50 parts by volume of water and dry over sodium sulfate. Concentrate the solution by evaporating under vacuum to 20 parts by volume and precipitate by addition of diethyl ether to obtain the title compound, M.P. 257° to 258° (starts to decompose at 240°).

By following the procedure described in Step (a) of this example but replacing the 3-(5-chloro-2-methylaminophenyl)isoindolin-1-one, i.e., a Compound II wherein $R^1$ is chloro and $R^2$ is methyl, with an equivalent of 3-(2-ethylaminophenyl)isoindolin-1-one, i.e., a Compound II wherein $R^1$ is a hydrogen atom and $R^2$ is ethyl, results in a similar manner in the preparation of the corresponding Compound IV, i.e., 3-(2-aminoethylphenyl)-1-oxo-isoindolo-2-acetic acid ethyl ester, which following the procedure described in Step (b) of this example results in the preparation of the corresponding Compound I, i.e., 5-ethyl-isoindolo[2,1-d][1,4]benzodiazepin-6,9(7H,13bH) dione.

Each Compound I has an asymmetric carbon atom (13b) and thus exists as a racemate or in an optically active form. Each of the optical antipodes (enantiomers) is within the scope of this invention. To obtain a particular optical antipode of a Compound I, an appropriate racemic Compound IV is converted from its ester form to its acid form (racemic), i.e., wherein $R^3$ is a hydrogen atom, and resolution of said acid form is effected according to well-known procedures to obtain the desired antipode, which is then converted to its ester form (antipode), i.e., the corresponding Compound IV, which is then converted by Step (b) to the corresponding Compound I (antipode). In some cases greater pharmacological activity or other beneficial attribute may be found with respect to a particular antipode, and in such instances administration of such antipode may be preferred.

What is claimed is:

1. A compound of the formula

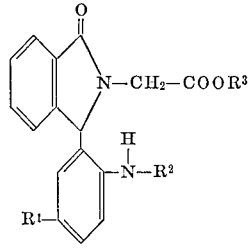

wherein $R^1$ is a member selected from the group consisting of a hydrogen atom, and halo having an atomic weight of 19 to 80;

$R^2$ is alkyl having from 1 to 2 carbon atoms;

$R^3$ is lower alkyl.

2. The compound according to claim 1 wherein $R^1$ is chloro, $R^2$ is methyl and $R^3$ is ethyl.

No references cited.

ALEX MAZEL, Primary Examiner

J. A. NARCAVAGE, Assistant Examiner

U.S. Cl. X.R.

260—239.3; 424—244